United States Patent [19]

Wentzel

[11] Patent Number: 4,567,931
[45] Date of Patent: Feb. 4, 1986

[54] SECTIONAL DOOR AND COMPONENTS THEREOF

[75] Inventor: Harold G. Wentzel, Union, Mich.

[73] Assignee: Uneek Cap and Door, Inc., Elkhart, Ind.

[21] Appl. No.: 538,165

[22] Filed: Oct. 3, 1983

[51] Int. Cl.⁴ ............................................. E06B 3/12
[52] U.S. Cl. .................................... 160/232; 160/236
[58] Field of Search ................ 160/40, 201, 229 R, 160/232, 236, 202, 235, 207; 49/397

[56] References Cited

U.S. PATENT DOCUMENTS

| | | | |
|---|---|---|---|
| 2,845,665 | 8/1958 | Place | 49/397 |
| 2,951,533 | 9/1960 | Lucas et al. | 160/232 X |
| 3,247,637 | 4/1966 | Robertson | 160/232 X |
| 3,344,837 | 10/1967 | Young | 160/207 X |

Primary Examiner—Kenneth Downey
Attorney, Agent, or Firm—Gordon W. Hueschen

[57] ABSTRACT

There is disclosed a sectional door for a capped pickup truck in which the sections comprise panel members framed by frame members made of hollow extrusions having front-panel-receiving channels on the front inner corners thereof and rear-panel-receiving chamfers on the rear inner corners thereof, beading receiving channels in the surface opposite the front-panel-receiving channels, complementary hinge-forming elements on the outer rear corners of the inner panels or inner sections, and screw-receiving channels on the inner surface of the side of the end members which is opposite the side having the panel receptors therein.

18 Claims, 9 Drawing Figures

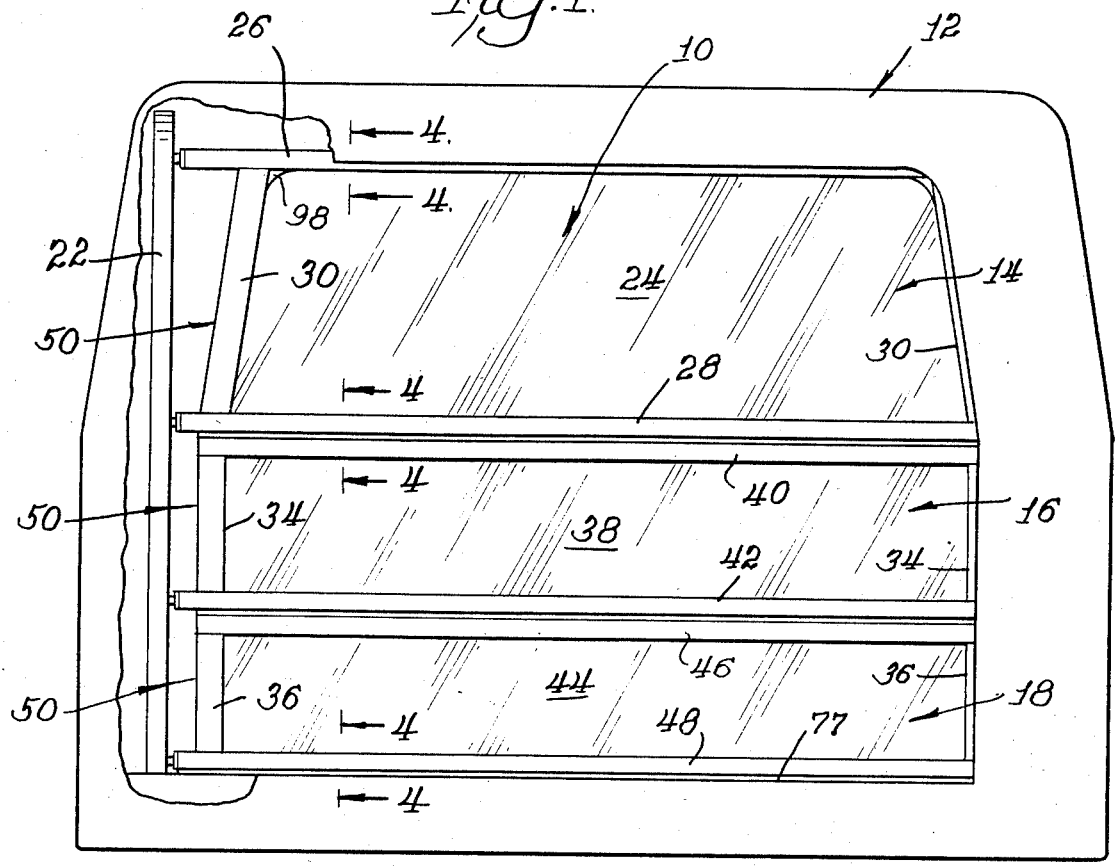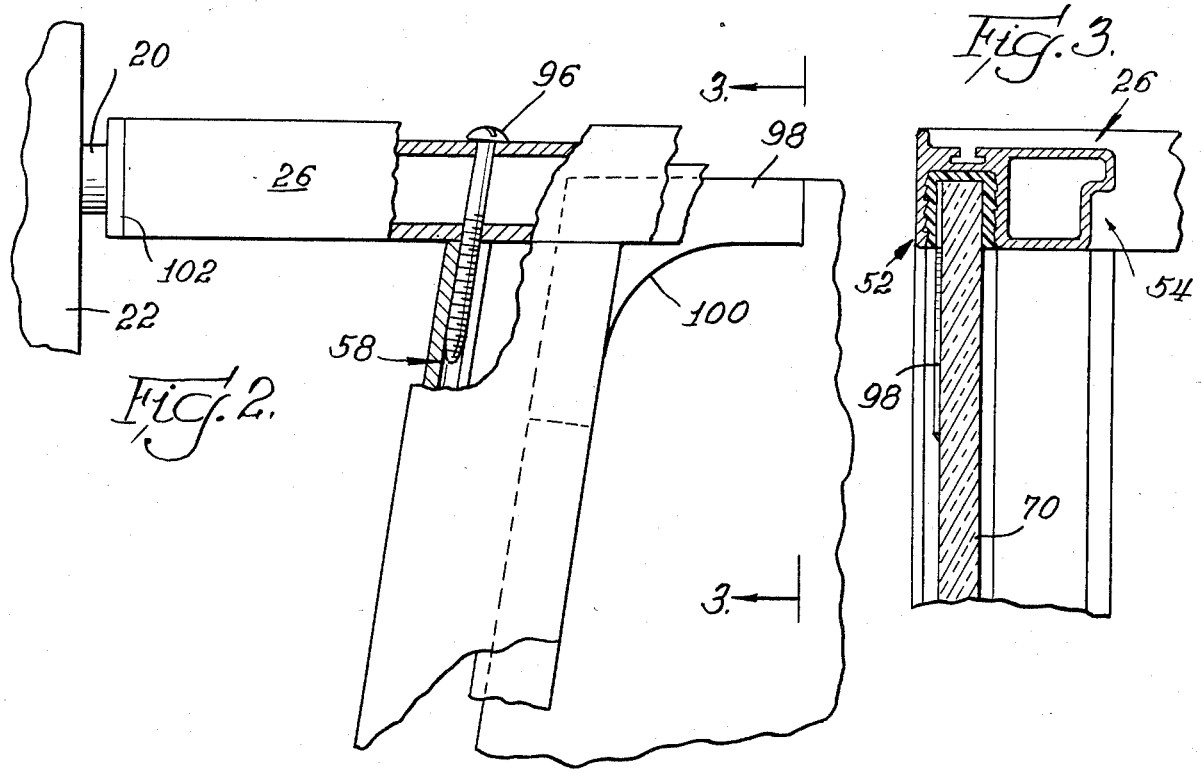

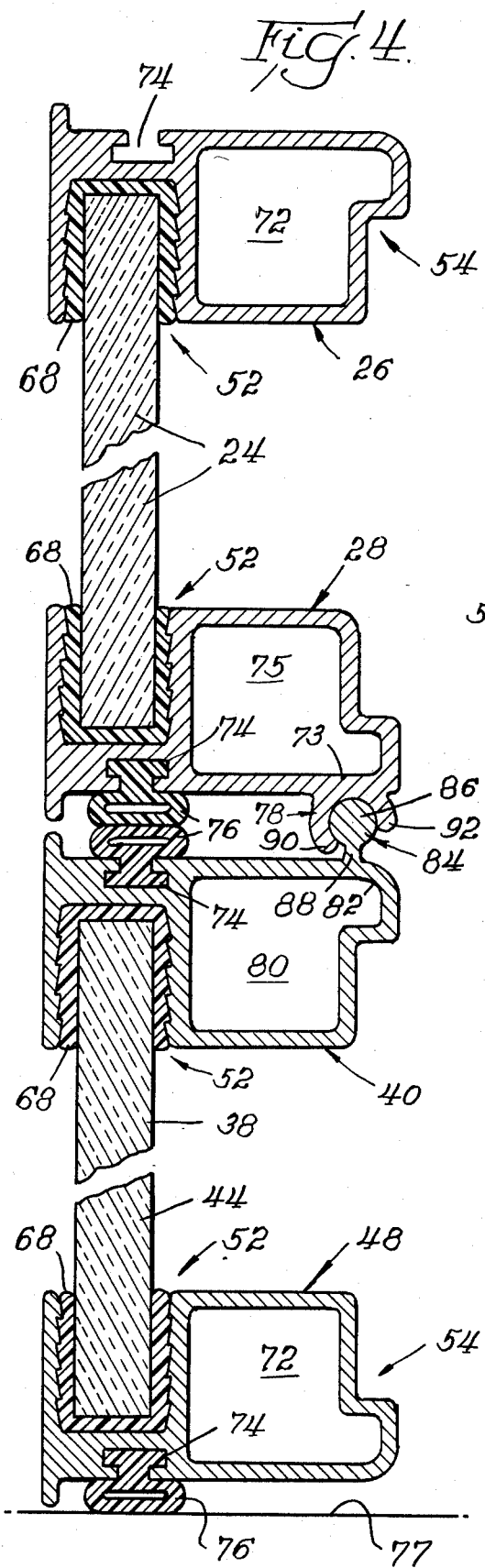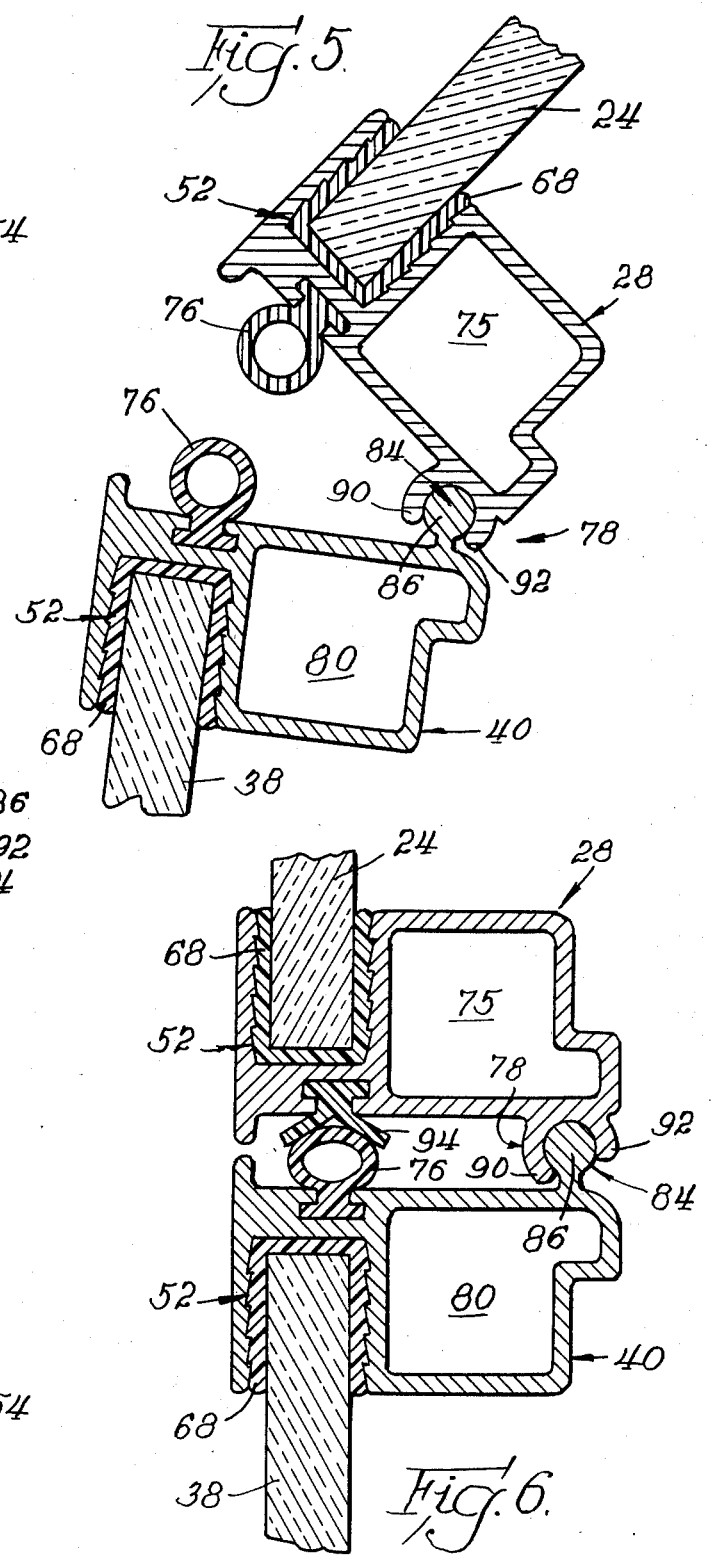

SECTIONAL DOOR AND COMPONENTS THEREOF

BACKGROUND OF THE INVENTION

1. Field of the Invention

The invention relates to a sectional door for use in capped pickup trucks and to components thereof.

2. Prior Art

Various overhead or sectional doors are known in the art. They are commercially used in garages and commercial buildings. Overhead doors are also used in vans and like commercial vehicles. These prior art doors, however, are not adapted for use in capped pickup trucks and none has the special structural features and advantages of the doors herein described.

It is an object of the invention, therefore, to provide new and improved overhead or sectional doors; to provide doors of the class described which are particularly adapted for use in capped pickup trucks; and to avoid the disadvantages of the prior art. It is a further object of the invention to provide novel frame members for framing sections of an overhead door; to provide such novel frame members that can be formed as extrusions which can be easily assembled around panels to form door sections; to provide such extrusions that have built-in hinge elements and means for effecting sealing between the adjacent sections and means for effecting sealing between the bottom sections and the truck bed; to obtain such further improvements in such frame members as will appear as the description proceeds; and to obtain such advantages as will appear hereinafter.

SUMMARY OF THE INVENTION

The invention relates to a sectional door, each section of which comprises transverse top, bottom, and end frame members forming a frame adapted to receive a panel; said frame members and said panel constituting a section of the sectional door; each said frame member comprising a hollow, tubular extrusion essentially rectangular in cross-section and having a panel-receiving channel along its front, inner edge; one said transverse frame member having a female hinge-forming member along the rear outer edge of the side opposed to said panel-receiving channel and another of said transverse frame members having a complementary male hinge-forming member along the corresponding rear outer edge thereof, whereby, when the male hinge-forming member is threaded into said female hinge-forming member, a hinge is formed which allows the two panels thus hinged together to move relative to one another about the rear edge thereof; the sides of said extrusions having hinge members thereon also having undercut channels adapted to have complementary sealing strips threaded thereinto, said undercut channels being so located that when said door is closed, the sealing strip of one channel abuts that of the other and the two sealing strips are compressed, one against the other.

The invention also comprises one or more further features in which said complementary male hinge-forming member comprises a cylindrical bead which is connected to said transverse frame member by a relatively narrow, stem-like portion and said female hinge-forming member has inner surfaces complementary to said bead and an opening to receive said stem-like portion, which opening is wide enough to allow the requisite hinge movement but not wide enough to allow said bead to pass through, in which said frame members have along the inner rear edges thereof a chamfer which, in the assembled frame, forms a panel-receiving annular indentation adapted to receive a rear panel member and may further comprises a screw-receiving channel located inside said tubular extrusion on and near the center of the side opposite the side having said panel-receiving channel.

From another perspective, the invention is also directed to a sectional door, the sections of which comprise transverse top, bottom, and end frame members forming a substantially rectangular frame having front-panel receiving channels along the inner front edges thereof and rear panel chamfers along the inner rear edges thereof, whereby, when the frame members are assembled around the front panel to form a section of the door, the rear inner edges will have an annular chamfer to receive the rear panel.

In this aspect of the invention, there may also be included further features in which juxtaposed transverse frame members are provided with complementary male and female hinge-forming members so formed and so located that the male hinge-forming member can be threaded into the female hinge-forming member to form a hinge along the apposed rear edges of the juxtaposed frames, in which said complementary male hinge-forming member comprises a cylindrical bead which is connected to said transverse frame member by a relatively narrow, stem-like portion and said female hinge-forming member has inner surfaces complementary to said bead and an opening to receive said stem-like portion which opening is wide enough to allow the requisite hinge movement but not wide enough to allow said bead to pass through, in which the juxtaposed sides have undercut channels into which sealing strips can be threaded and which are so located that, when the door is closed, the opposed sealing strips will seal, one against the other, in which a screw-receiving channel is located on the inner surface of the side opposite the side which has the panel-receiving channels thereon, and in which said screw-receiving channel is located near the center of the side opposite the side having said panel-receiving channels.

The invention also relates to extrusions suitable for framing sections of a sectional door which comprises a hollow, tubular extrusion essentially rectangular in cross section and having a front panel-receiving channel indented in the inner side of said frame member adjacent to the front side thereof; the front side of said frame member also constituting the front wall of said channel and the inner wall of said channel constituting a part of the inside wall of said extrusion.

According to this aspect of the invention, there may be incorporated one or more further features in which the bottom wall of said channel is relatively thick and extends up to the surface of the outer side of said extrusion, in which the outer side has an undercut channel in the relatively thick wall between that side and the bottom of said panel-receiving channel, in which the corner opposite said undercut channel and cater-cornered to said panel-receiving channel has a male hinge-forming element comprising a cylindrical bead connected to said extrusion by a relatively narrow strip, and in which there is provided, at its inner, rear corner, a chamfer, adapted to form, when a frame is made from like frame members, an annular rear-panel-receiving chamfer. Also, there may be incorporated the further feature in which the bottom wall of said panel-receiving channel has substantially the same thickness as the side walls thereof and is spaced from the outer side of said extrusion whereby the tubular portion of said extrusion has a panhandle bounded by the outer side of said extrusion, the front side of said extrusion, and the bottom of said channel. In this form, there can be a further modification in which the inner surface of the outer side of said extrusion has a screw-receiving channel substantially in the center thereof, said screw-receiving channel having bent-in sides forming a bore adapted to receive a self-threading screw.

BRIEF DESCRIPTION OF THE DRAWINGS

FIG. 1 is a rear view of a capped truck according to the invention;

FIG. 2 is a fragmentary view of the top section;

FIG. 3 is a cross section taken along line 3—3 of FIG. 2;

FIG. 4 is a cross section taken along line 4—4 of FIG. 1;

FIG. 5 is a detail of the middle portion of FIG. 4 in a partially open position;

FIG. 6 is a detail of a modified form of FIG. 5 in closed position;

DESCRIPTION OF THE PREFERRED EMBODIMENTS

Figure 7:
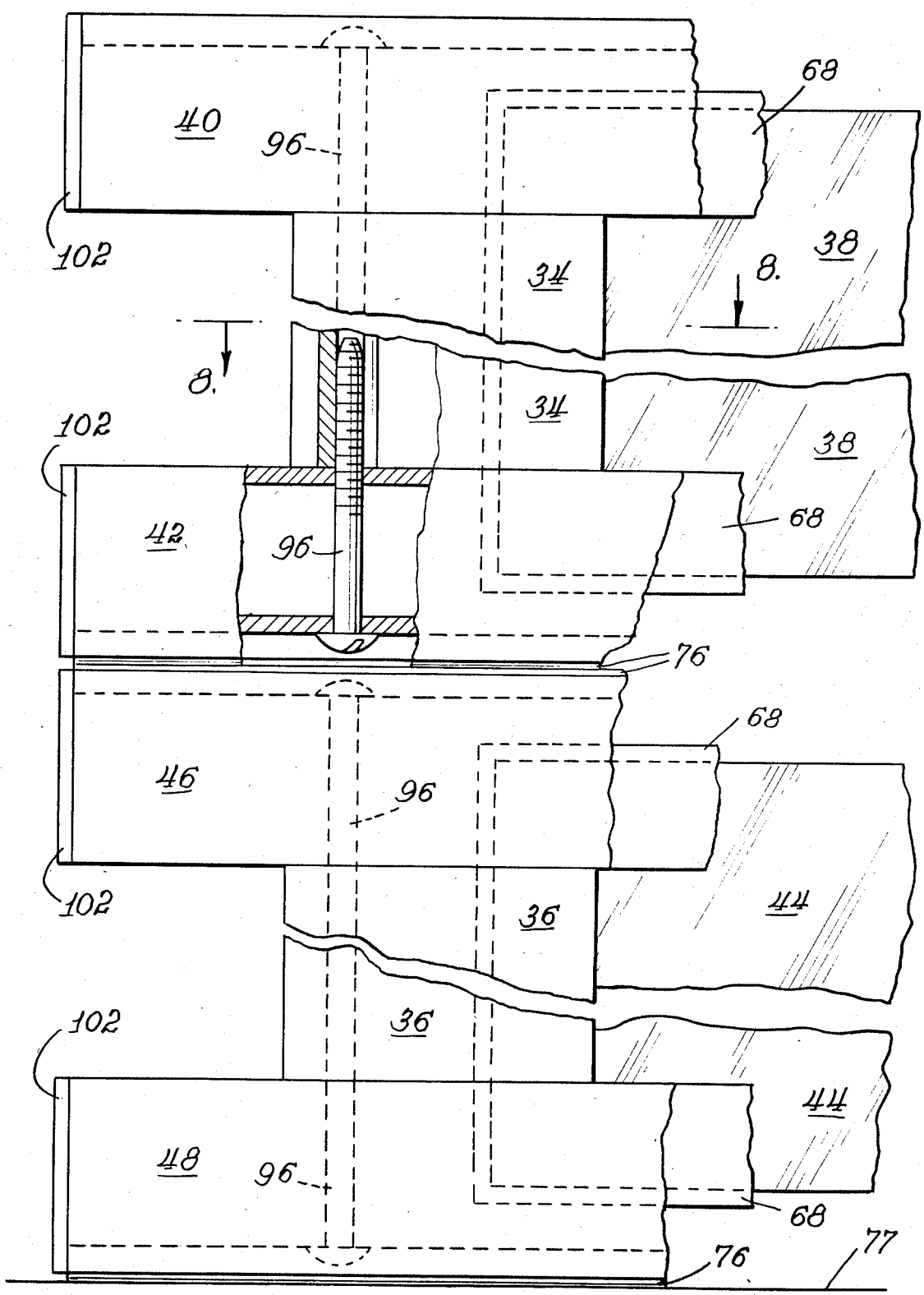
FIG. 7 shows a modification of the two bottom sections of FIG. 1.

In FIG. 1 there is shown a sectional door 10 mounted in a capped pickup 12. The door is made up of sections 14, 16, and 18 hinged together, having rollers 20 (FIG. 8) adapted to roll in the roller guides 22 mounted alongside the open end of the capped truck and along the roof thereof. Details of the mounting of the roller guides, and details of the rollers are disclosed in my copending application, Ser. No. 489,582, filed Apr. 28, 1983, and do not form a part of this invention.

The section 14 is made up of a panel 24 framed by a transverse top frame member 26 and a bottom transverse frame member 28 and end frame members 30. The right-hand frame member 30 is just barely visible as it is mostly behind the door frame 32 but is the mirror image of the one shown. The same is true with regard to the side frame members 34 and 36 of the sections 16 and 18.

The middle section 16 comprises a panel 38 framed by top transverse frame member 40 and bottom transverse frame member 42 and the end or side frame members 34.

The bottom section comprises panel 44 framed by top transverse member 46 and bottom transverse frame member 48 and end or side frame members 36.

The side frame members 30, 34, and 36 are hollow extrusions 50 of aluminum or like extrudable material having a cross section which is generally rectangular, but which is modified by a front-panel-receiving channel 52 located in the inner front portion or corner of the extrusion and a rear-panel-receiving chamfer 54 located in the rear inner corner of the extrusion and opposite the front-panel-receiving channel 52. The rear panel is optional and provides insulation or decoration and may be removable, being held in place by screws and/or turn buttons. In addition, where glass or other transparent material is used for the outside panel, the side of the inside panel facing the glass may be decorative and may have a different design on the other side, as they are symmetrical and reversible. It will be noted that all four frame members have recesses 54, which in the assembled section, form an annular chamfer to receive the inside panel. On the inner surface 56 of the outer side, there is a screw-receiving channel 58. The channel 58 has a cylindrical bore 60 and is open at 62 so that the sides 64 can spring apart when a self-threading screw is screwed into the channel.

The front-panel-receiving channel 52 is provided interiorly with saw-tooth detents 66 adapted to bite into plastic seal 68 around the panel 70 in order to form a firm anchor of the panel in the channel 52.

The front panel 70 can be pressboard, glass, or any other suitable material. Panels of different thicknesses can be used provided a plastic seal 68 with the proper wall thickness is used.

The top transverse frame member 26 has a configuration shown in FIGS. 3 and 4. The same extrusion 72 is used for both the top transverse frame member 26 and the bottom transverse frame member 48. It has an undercut channel 74 adapted to receive a plastic beading or sealing strip 76 having a T-shaped portion adapted to be threaded into channel 74. When the door is open, the beading or sealing strip 76 has the shape in FIG. 5 and, when the door is closed, it is compressed against the truck bed 77, as shown in FIG. 4, or against a like sealing member 76, as shown in FIG. 6, to provide a watertight seal.

Extrusion 72 has a generally rectangular outline except for the chamfer 54, and like the extrusion 50, has the front-panel-receiving channel 52 inset or indented therein. Unlike extrusion 50, though, the channel 52 extends close to the opposite wall and has a relatively thick bottom into which the channel 74 is undercut.

The bottom transverse frame member 28 comprises an extrusion 75 having the configuration shown in FIGS. 4, 5, and 6. It is the same as extrusion 72, except that at the inner, outer corner 73, there is provide a female hinge-forming member 78.

The top transverse frame member 40 is an extrusion 80 which is the same as extrusion 75, but has at its inner, outer edge 82, male hinge-forming element 84.

The male hinge-forming element 84 comprises a cylindrical portion 86 connected to and forming a part of the extrusion 80 by a stem-like portion 88. The female hinge-forming member 78 has an inner cylindrical surface complementary to the curvature of the cylindrical portion 86 and an opening, the ends 90 and 92 of which are spaced apart sufficiently for the hinged extrusions 75 and 80 to rotate to a position shown in FIG. 5, but insufficient to allow the cylindrical member 84 to pass through it. Thus, in use, the cylindrical member 86 of the male hinge-forming member 84 is threaded into the female hinge-forming member 78, to provide a hinge, as shown in FIGS. 4 and 5. The bottom transverse frame-forming member 42 and the top frame-forming member 46 are constructed exactly the same as frame members 28 and 40, respectively.

Figure 8:
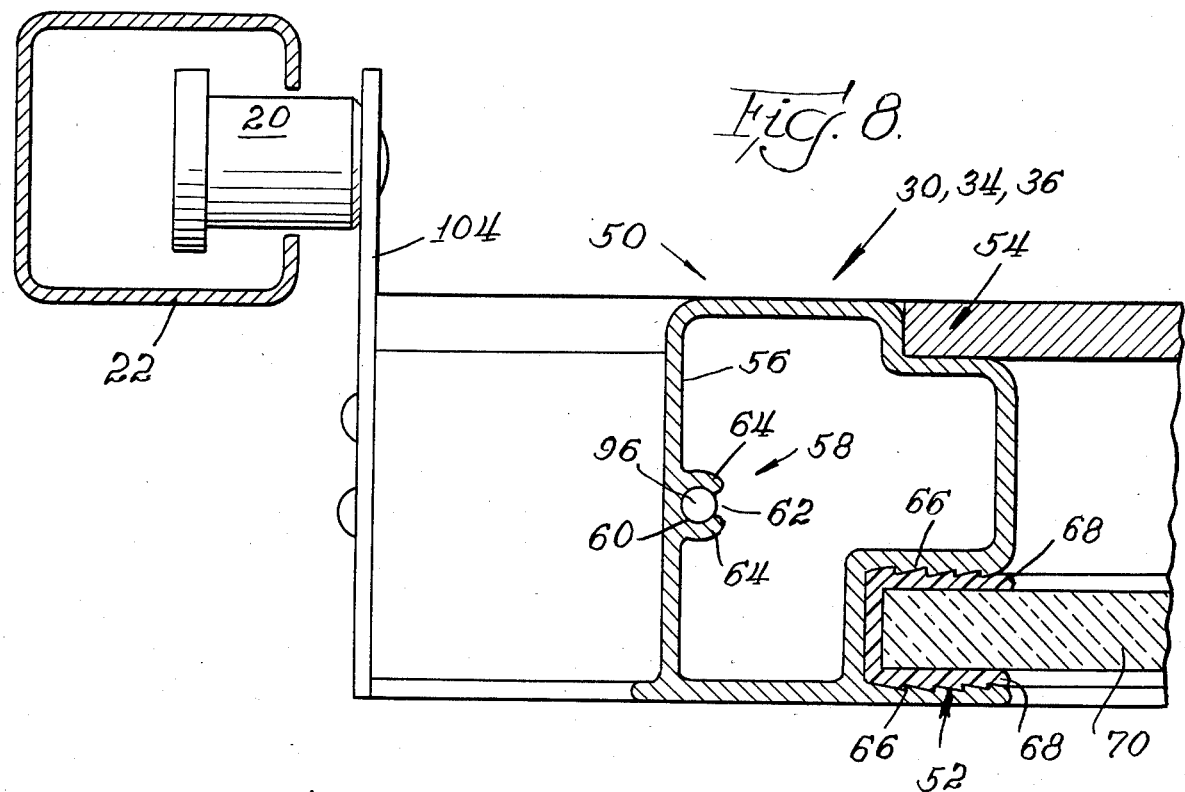
FIG. 8 is a partial section taken along line 8—8 of FIG. 7.

The top frame member 26 and bottom frame member 28 of the top section 24 extend out to adjacent the track 22 and have mounted thereon rollers substantially as shown in FIG. 8. The bottom frame member 42 of the middle section 38 and the bottom frame member 48 of the middle section 44 also extend out to the vicinity of the track 22 and are provided with rollers substantially as shown in FIG. 8.

When the door sections move from the position shown in FIG. 5 to that shown in FIG. 4, the beadings 76 meet and compress, one against the other, as shown at 76 in FIG. 4, thus making a weatherproof seal.

In FIG. 6 there is shown a modification in which the beading 76, which is threaded into extrusion 80, is apposed to a Y-shaped sealing member 94 which sits astraddle the beading 76 and makes a waterproof seal. Both the beading 76 and the seal are made of resilient material, such as rubber, or like plastic material.

Referring back to FIG. 2 now, it will be observed that the side frame member 30 is cut at an angle. Screw 96 is passed through the upper frame member 26 and down into the screw-receiving channel 58. A like construction is observed at each of the four corners of the frame. Similarly, the frames for panels 38 and 44 are so constructed, except that the ends of the side members 36 and 34 are square cut, to provide a rectangular frame. As shown in FIGS. 2 and 3, there may be provided corner shields 98, of stainless steel or the like, which fit into the front panel-receiving channels 52 in front of the front panel 70. The stainless steel shield 98 can be cut on a curve 100, or like configuration, for any desired decorative effect.

FIG. 7 shows how the bottom two panels 38 and 44 are assembled. Unlike FIG. 1, however, frame members 40 and 46 also extend out to a position adjacent the track 22. The ends of the frame members 40, 42, 46, and 48 are provided with caps 102 on which can be mounted roller brackets 104, as shown in FIG. 8.

Figure 9:
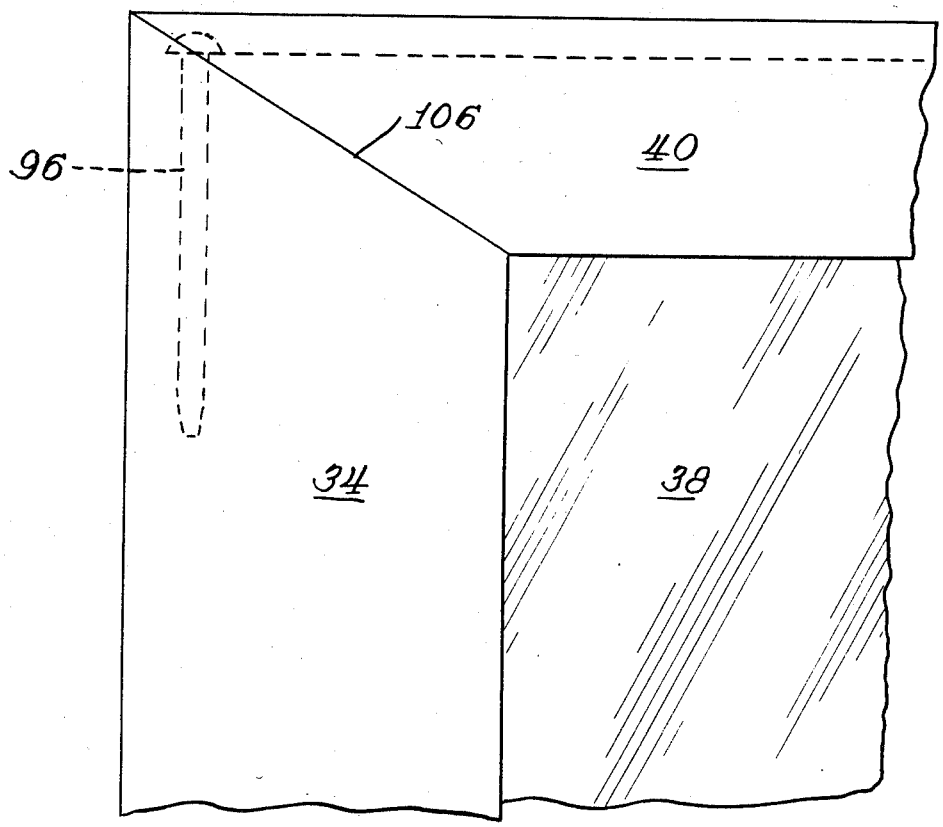
FIG. 9 is a modified form of the invention.

In FIG. 9 there is illustrated a modification in which the transverse frame member 40 is fastened to the side frame member 34 on a mitre joint 106 rather than on a butt joint as in the other described forms.

It is to be understood that the invention is not to be limited to the exact details of construction, operation, or exact materials or embodiments shown and described, as various modifications and equivalents will be apparent to one skilled in the art, and the invention is therefore to be limited only by the full scope of the appended claims.

I claim:

1. A sectional door, each section of which comprises top, bottom, and end frame members forming a frame adapted to receive a panel; said frame members and said panel constituting a section of the sectional door; each said frame member comprising a hollow flat-sided, single-tube tubular extrusion essentially rectangular in cross-section and having a panel-receiving channel indented in the inner side along its front, inner edge; one said transverse frame member having a female hinge-forming member along and at the rear outer edge of the side opposed to said panel-receiving channel and another of said transverse frame members having a complementary male hinge-forming member along at at the corresponding rear outer edge thereof, whereby, when the male hinge-forming member is threaded into said female hinge-forming member, a hinge is formed which allows the two panels thus hinged together to move relative to one another about the rear edge thereof.

2. A sectional door of claim 1, in which said complementary male hinge-forming member comprises a cylindrical bead which is connected to said transverse frame member at the edge thereof by a relatively narrow, stem-like portion and said female hinge-forming member has inner surfaces complementary to said bead and an opening to receive said stem-like portion, which opening is wide enough to allow the requisite hinge movement but not wide enough to allow said bead to pass through.

3. A sectional door of claim 1, in which said frame members have along the inner rear edges thereof a chamfer which, in the assembled frame, forms a panel-receiving annular indentation adapted to receive a rear panel member.

4. A sectional door of claim 2, which further comprises a screw-receiving channel located inside said tubular extrusion on and near the center of the side opposite the side having said panel-receiving channel and in which said frame members have along the inner rear edges thereof a chamfer which, in the assembled frame, forms a panel-receiving annular indentation adapted to receive a rear panel member, whereby, when the frame members are assembled around the front panel to form a section of the door, the rear inner edges will have an annular chamfer to receive the rear panel.

5. A sectional door the sections of which comprise top, bottom, and end, single-tube, hollow frame members forming a substantially rectangular frame having an annular, U-shaped front-panel receiving channel along the inner front edges thereof and an annular, L-shaped rear-panel chamfer along the inner rear edges thereof, said frame members being assembled around a front panel to form a section of the door with the front panel seated in said channel, said annular, U-shaped channel having outside faces which are aligned in a common plane and which frame said front panel, and said annular chamfer being open to the rear to receive a rear panel after the section is assembled.

6. A sectional door of claim 5, in which juxtaposed transverse frame members are provided with complementary male and female hinge-forming members so formed that the male hinge-forming member can be threaded into the female hinge-forming member to form a hinge and being located off center along and at the opposed rear edges of the juxtaposed frame members.

7. A sectional door of claim 6, in which said complementary male hinge-forming member comprises a cylindrical bead which is connected to said transverse frame member by a relatively narrow, stem-like portion and said female hinge-forming member has inner surfaces complementary to said bead and an opening to receive said stem-like portion, which opening is wide enough to allow the requisite hinge movement but not wide enough to allow said bead to pass through.

8. A sectional door of claim 6, in which at least one of the juxtaposed sides has an undercut channel into which a sealing strip having a complementary leg can be threaded and which is so located that, when the door is closed, the sealing strip will be compressed to effect a seal.

9. A sectional door of claim 6, in which the opposed side of the juxtaposed frame members have undercut channels into which complementary sealing strips can be threaded and which are so located that, when the door is closed, the opposed sealing strips will seal, one against the other.

10. A frame member for framing sections of a sectional door which comprises a hollow, tubular extrusion essentially rectangular in cross section and having a U-shaped, front panel-receiving channel indented in the inner side of said frame member adjacent to the front side thereof; the front side of said frame member also constituting the front wall of said channel and the rear wall of said channel constituting a part of the front wall of the hollow portion of said extrusion.

11. A frame member of claim 10, in which the bottom wall of said channel is relatively thick and extends to the surface of the outer side of said extrusion.

12. A frame member of claim 10, in which the bottom wall of said panel-receiving channel has substantially the same thickness as the side walls thereof and is spaced from the outer side of said extrusion whereby the hollow portion of said extrusion has a panhandle bounded by part of the front walls of said hollow portion of extrusion, the front side of said extrusion, and the bottom of said channel.

13. The frame member of claim 11, in which the outer side has an undercut channel in the relatively thick wall between that side and the bottom of said panel-receiving channel.

14. A frame member of claim 13, in which the corner opposite said undercut channel and cater-cornered to said panel-receiving channel has a male hinge-forming element comprising a cylindrical bead connected to said extrusion by a relatively narrow strip.

15. A frame member of claim 13, in which the corner opposite the undercut panel, and cater-cornered to said panel-receiving channel, has a female hinge-forming element comprising an elongated channel, the sides of which are bent in to form an inner cylindrical surface.

16. A frame member of claim 10, in which there is provided, at its inner, rear corner, a chamfer, adapted to form, when a frame is made from like frame members, an annular rear-panel-receiving chamber.

17. A sectional door, each section of which comprises top, bottom, and end frame members forming a frame adapted to receive a panel; said frame members and said panel constituting a section of the sectional door; each said frame member comprising a hollow, tubular extrusion essentially rectangular in cross-section and having a panel-receiving channel along its front, inner edge; one said transverse frame member having a female hinge-forming member along the rear outer edge of the side opposed to said panel-receiving channel and another of said transverse frame members having a complementary male hinge-forming member along the corresponding rear outer edge thereof, whereby, when the male hinge-forming member is threaded into said female hinge-forming member, a hinge is formed which allows the two panels thus hinged together to move relative to one another about the rear edge thereof; in which the side of an extrusion having a hinge member thereon also has an undercut channel adapted to have a sealing strip fitted there into, said undercut channel being so located that when the door is closed, the sealing strip is compressed to effect a seal.

18. A sectional door of claim 17, in which the sides of said extrusions having hinge members thereon also have undercut channels adapted to have complementary sealing strips threaded thereinto, said undercut channels being so located that when said door is closed, the sealing strip of one channel abuts that of the other and the two sealing strips are compressed one against the other.

* * * * *

UNITED STATES PATENT AND TRADEMARK OFFICE
CERTIFICATE OF CORRECTION

PATENT NO. : 4,567,931

DATED : February 4, 1986

INVENTOR(S) : Harold G. Wentzel

It is certified that error appears in the above-identified patent and that said Letters Patent is hereby corrected as shown below:

Col. 4, line 24; after "shape" insert -- shown --

Col. 4, line 38; "provide" should read -- provided

Col. 5, line 53; change "at" (first occurrence) to -- and --

Col. 6, line 55; "side" should read -- sides --

Col. 7, line 9; "walls" should read -- wall --

Col. 7, line 10; before "extrusion" (first occurrence) insert -- said --

Col. 7, line 30; "chamber" should read -- chamfer --

Signed and Sealed this

Eighth Day of July 1986

[SEAL]

Attest:

DONALD J. QUIGG

Attesting Officer     Commissioner of Patents and Trademarks